Dec. 14, 1965 J. N. HAILE 3,223,930

ELECTRIC GATING CIRCUITS

Filed Dec. 17, 1962

INVENTOR
James Neville Haile
BY
Kinchloe, Kinchloe & Ottinger
ATTORNEYS

United States Patent Office 3,223,930
Patented Dec. 14, 1965

3,223,930

ELECTRIC GATING CIRCUITS

James Neville Haile, Fareham, England, assignor to The General Electric Company Limited, London, England, a British company Filed Dec. 17, 1962, Ser. No. 246,865
Claims priority, application Great Britain, Dec. 20, 1961, 45,701/61
3 Claims. (Cl. 328—95)

This invention relates to electric gating circuits.

A known form of gating circuit is an "AND" gate, having two input paths and an output path. The gate operates such that a signal is supplied over the output path when, and only when, suitable signals are supplied simultaneously over both input paths.

An example will now be given of an arrangement in which the use of such a gate may not be satisfactory. In this case one of the signals supplied over the input path is a continuous train of short duration clock pulses having a constant pulse repetition rate, and the other signal includes a comparatively long duration gate pulse. The clock pulses passed by the gate are supplied to a counter, so that the count registered by the counter should define the duration of the gate pulse. In fact, however, the count registered may not always define the duration of the gate pulse with the required accuracy and consistency.

This is because there are a number of possible sources of error arising from the use of the gate. In particular, as the clock pulses must have a finite duration, different phases of a gate pulse relative to the clock pulses may result in gate pulses of the same duration giving rise to different counts in the counter. The actual count registered by the counter will be dependent not only on this phase but also, where this phase is such that a part of a clock pulse is passed by the gate, upon the minimum duration of clock pulse necessary to cause a count of one to be registered in the counter in respect of that clock pulse.

It is, therefore, an object of the present invention to provide an electric gating circuit which, if used in the arrangement outlined above, results at least in a reduction in errors which arise for the reasons given.

According to the present invention, an electric gating circuit comprises a first input path over which a clock pulse signal comprising a train of clock pulses is arranged to be supplied, a second input path over which a gating signal which includes an input gate pulse is arranged to be supplied, means to derive from said signals a derived gate pulse the duration of which coincides with the duration of the input gate pulse less any portion of the duration of the input gate pulse contiguous with its leading edge which portion is coincidence with a part only of the duration of a clock pulse, and an "AND" gate to which the clock pulse signal and the derived gate pulse are supplied, the arrangement being such that the "AND" gate only passes those clock pulses whose leading edges fall within the duration of the input gate pulse.

An electric gating circuit in accordance with the present invention will now be described by way of example with reference to the accompanying drawing, in which.

Figure 1:
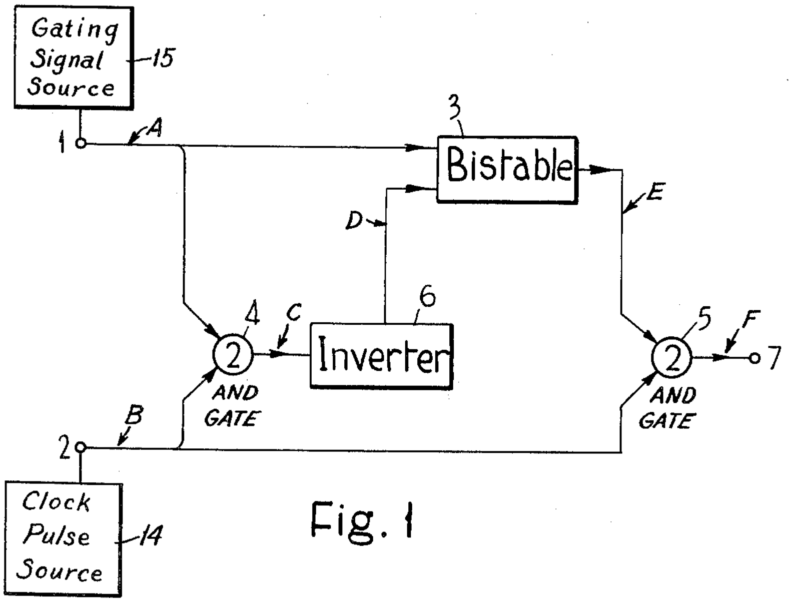
FIGURE 1 shows the gating circuit in block schematic form.

Referring now to FIGURE 1 of the drawing, the gating circuit has two input terminals 1 and 2. During operation a clock pulse signal comprising a continuous train of short duration clock pulses having a constant pulse repetition rate is supplied to the terminal 2 by a source 14, and a gating signal including a comparatively long duration gate pulse is supplied to the terminal 1 by a source 15.

The terminal 1 is connected to a two-condition bistable trigger circuit 3 and to an "AND" gate 4, whilst the terminal 2 is connected to the gate 4 and to an "AND" gate 5. The output of the gate 4 is connected by way of an inverter circuit 6 to the bistable circuit 3, the output of which is connected to the gate 5. The output of the gate 5 is connected to an output terminal 7.

Figure 2:
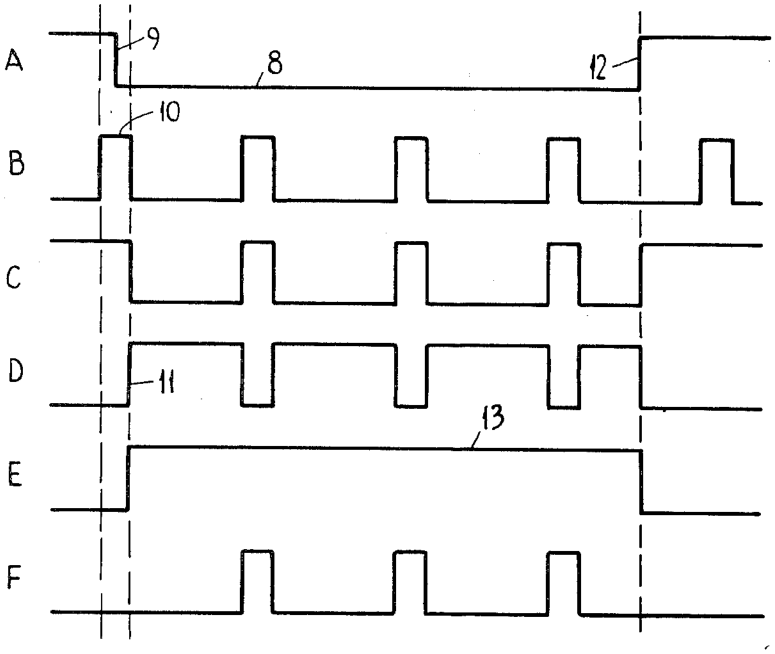
FIGURE 2 shows the waveforms of various signals to which reference is made in connection with FIGURE 1.

To describe the operation of the gating circuit, reference will also be made to FIGURE 2 of the drawing. The waveform A of FIGURE 2 shows the gating signal supplied to the terminal 1, this signal including the input gate pulse 8. The gate pulse 8 is so phased relative to the clock pulse signal, represented by the waveform B of FIGURE 2, which is supplied to the terminal 2, that the leading edge 9 of the gate pulse 8 occurs at some intermediate time in the duration of a clock pulse 10 of the clock pulse signal.

Signals as represented by the waveforms A and B are, therefore, supplied to the gate 4, which operates so as to be opened by the gate pulse 8 only when no clock pulse of the clock pulse signal represented by waveform B is present. The output signal supplied by the gate 4 is therefore as represented by the waveform C of FIGURE 2. This signal is supplied to the inverter circuit 6 which therefore supplies a signal as represented by the waveform D of FIGURE 2.

Signals as represented by the waveforms A and D are supplied to the bistable circuit 3, which is triggered into one of its stable conditions by the first positive-going edge 11 of the signal represented by the waveform D, and into its other stable condition by the first positive-going edge 12 of the signal represented by the waveform A. The bistable circuit 3 therefore supplies a signal as represented by the waveform E of FIGURE 2, this signal comprising a derived gate pulse 13 having a duration equal to that of the gate pulse 8 less that part of the duration of the gate pulse 8 which coincides with a part of the duration of the clock pulse 10.

The gate pulse 13 is then used, in place of the gate pulse 8, to control the gate 5, to which the clock pulse signal is supplied from the terminal 2. The output signal supplied by the gate 5 to the terminal 7 is therefore as represented by the waveform F of FIGURE 2, and will comprise only those clock pulses whose positive leading edges fall within the duration of the gate pulse 8.

I claim:

1. An electric gating circuit comprising a first input path over which a clock pulse signal comprising a train of clock pulses is arranged to be supplied, a second input path over which a gating signal which includes an input gate pulse is arranged to be supplied, means to derive from said signals a derived gate pulse the duration of which coincides with the duration of the input gate pulse less any portion of the duration of the input gate pulse contiguous with its leading edge which portion is coincident with a part only of the duration of a clock pulse, and an "AND" gate to which the clock pulse signal and the derived gate pulse are supplied, the arrangement being such that the "AND" gate only passes those clock pulses whose leading edges fall within the duration of the input gate pulse.

2. An electric gating circuit comprising a first input path over which a clock pulse signal comprising a train of clock pulses is arranged to be supplied, a second input path over which a gating signal which includes an input gate pulse is arranged to be supplied, an "AND" gate to which the clock pulse signal and the gating signal are arranged to be supplied, this "AND" gate then supplying an output signal formed by those parts of the gate pulse which are not coincident with any part of a clock pulse, an inverter circuit to which the output signal supplied by said "AND" gate is arranged to be supplied and which operates to invert the polarity of this output signal to supply an inverted output signal, a two-condition bistable trigger circuit to which the gating signal and the inverted output signal are arranged to be supplied, the trigger circuit being triggered from one of its stable conditions to the other stable condition by the leading edge of the inverted output signal and remaining in said other stable condition until triggered back into the original stable condition by the trailing edge of the gating pulse and the trigger circuit supplying a derived gate pulse the leading and trailing edges of which coincide with the instants at which the trigger circuit changes condition, and a further "AND" gate to which the clock pulse signal and the derived gate pulse are supplied, the arrangement being such that the further "AND" gate only passes those clock pulses whose leading edges fall within the duration of the input gate pulse.

3. An electric gating circuit comprising a first input path, a clock pulse source to supply to the first input path a clock pulse signal comprising a train of clock pulses, a second input path, a gating signal source to supply to the second input path a gating signal including a gate pulse of longer duration than each clock pulse, means to derive from said signals a derived gate pulse the duration of which coincides with the duration of the input gate pulse contiguous with its leading edge which portion is coincident with a part only of the duration of a clock pulse, and an "AND" gate to which the clock pulse signal and the derived gate pulse are supplied, the arrangement being such that the "AND" gate only passes those clock pulses whose leading edges fall within the duration of the input gate pulse.

References Cited by the Examiner

UNITED STATES PATENTS

| | | | |
|---|---|---|---|
| 2,866,092 | 12/1958 | Raynsford | 328—95 |
| 3,028,552 | 4/1962 | Hahs | 328—55 |

ARTHUR GAUSS, *Primary Examiner.*

KATHLEEN H. CLAFFY, *Examiner.*